(12) United States Patent
Betz

(10) Patent No.: US 9,079,564 B2
(45) Date of Patent: Jul. 14, 2015

(54) TENSIONER FOR A SEATBELT

(75) Inventor: Hans-Peter Betz, Boebingen (DE)

(73) Assignee: TRW AUTOMOTIVE GMBH, Alfdorf (DE)

( * ) Notice: Subject to any disclaimer, the term of this patent is extended or adjusted under 35 U.S.C. 154(b) by 0 days.

(21) Appl. No.: 14/233,958

(22) PCT Filed: Jul. 6, 2012

(86) PCT No.: PCT/EP2012/002856
§ 371 (c)(1),
(2), (4) Date: Feb. 14, 2014

(87) PCT Pub. No.: WO2013/013768
PCT Pub. Date: Jan. 31, 2013

(65) Prior Publication Data
US 2014/0175210 A1    Jun. 26, 2014

(30) Foreign Application Priority Data
Jul. 25, 2011   (DE) .......................... 10 2011 108 349

(51) Int. Cl.
*B60R 22/46* (2006.01)
*B60R 22/195* (2006.01)

(52) U.S. Cl.
CPC ............. *B60R 22/46* (2013.01); *B60R 22/1955* (2013.01); *B60R 22/4633* (2013.01)

(58) Field of Classification Search
CPC .............. B60R 22/195; B60R 22/1953; B60R 22/1955; B60R 22/4633; B60R 2022/4638; B60R 22/46
USPC .............................. 280/806; 297/480; 188/371
See application file for complete search history.

(56) References Cited

U.S. PATENT DOCUMENTS

| | | | | |
|---|---|---|---|---|
| 5,607,185 A * | 3/1997 | Isaji et al. | ...................... | 280/806 |
| 5,871,235 A * | 2/1999 | Wier | .............................. | 280/806 |
| 5,908,222 A * | 6/1999 | Wier | .............................. | 297/480 |
| 6,089,605 A | 7/2000 | Muller | | |
| 6,250,682 B1 * | 6/2001 | Betz et al. | ...................... | 280/806 |
| 6,325,416 B1 * | 12/2001 | Wier | .............................. | 280/806 |
| 7,533,902 B2 * | 5/2009 | Arnold et al. | ................. | 280/806 |
| 7,690,292 B2 * | 4/2010 | Woecht | .............................. | 92/19 |
| 7,878,548 B2 * | 2/2011 | Kohama | ....................... | 280/806 |
| 8,287,049 B2 * | 10/2012 | Kohama | ....................... | 297/479 |
| 2004/0259672 A1 * | 12/2004 | Betz | .............................. | 474/101 |
| 2006/0279077 A1 * | 12/2006 | Nakano et al. | ................. | 280/806 |
| 2008/0012283 A1 * | 1/2008 | Woecht | .......................... | 280/806 |

FOREIGN PATENT DOCUMENTS

DE    10 2006 032 447    1/2008

* cited by examiner

*Primary Examiner* — Paul N Dickson
*Assistant Examiner* — Timohty Wilhelm
(74) *Attorney, Agent, or Firm* — Tarolli, Sundheim, Covell & Tummino LLP

(57) ABSTRACT

A tensioner (10) for a seat belt includes a cylinder tube (12), a piston (14) that is movably arranged in the cylinder tube (12), a tension transmission means (24) connected to the piston (14) at a connecting portion (26) for transmitting the movement of the piston (14) to the seat belt, as well as a drive (18) which is adapted to exert a driving force in a tensioning direction A on the piston (14) so as to tension the seat belt. The tensioner (10) moreover includes a return stop which counteracts a displacement of the piston (14) in a direction B opposite to the tensioning direction A. The connecting portion (26) is arranged in the tensioning direction A ahead of the return stop.

9 Claims, 4 Drawing Sheets

TENSIONER FOR A SEATBELT

RELATED APPLICATIONS

This application corresponds to PCT/EP2012/002856, filed Jul. 6, 2012, which claims the benefit of German Application No. 10 2011 108 349.2, filed Jul. 25, 2011, the subject matter of which are incorporated herein by reference in their entirety.

BACKGROUND OF THE INVENTION

The invention relates to a tensioner for a seat belt.

Belt tensioners serve for quickly retracting or reducing a possibly present belt slack so that the seat belt can fully develop its protective effect for the occupant. In the case of so called linear tensioners which make use of a linear displacement of a piston in a cylinder tube for tensioning the seat belt a return stop serves for preventing the piston from returning to its initial position after the tensioning operation. In view of the installation space in vehicles which is available to a restricted extent only the overall length of the tensioners is a substantial criterion for installation.

SUMMARY OF THE INVENTION

It is the object of the invention to provide an as compact linear tensioner as possible comprising a return stop.

This object is achieved by a tensioner for a seat belt comprising the features of claim 1. Advantageous and expedient configurations of the tensioner according to the invention are described in the subclaims.

The tensioner for a seat belt according to the invention comprises a cylinder tube, a piston which is movably arranged in the cylinder tube, a tension transmission means connected to the piston at a connecting portion so as to transmit the movement of the piston to the seat belt, and a drive is adapted to exert a driving force in a tensioning direction on the piston for tensioning the seat belt. The tensioner according to the invention moreover comprises a return stop counteracting a displacement of the piston in a direction opposite to the tensioning direction. In accordance with the invention, the connecting portion is arranged ahead of the return stop in the tensioning direction.

The invention is based on the finding that installation space can be saved by the arrangement of the connecting portion according to the invention without the functionality of the tensioner being influenced. Practically the entire length of the connecting portion is available as additional tensioning distance so that the length of the cylinder tube can be designed to be appropriately shorter. The overall length of the tensioner according to the invention is shortened by 15 to 20 mm compared to known linear tensioners.

The structure according to the invention is especially suited for a tensioner in which the piston has a conical portion which is part of the return stop. The connecting portion then borders on the end of the conical portion which has the smaller diameter.

For a maximum saving of installation space an embodiment is advantageous in which the tension transmission means does not or not significantly protrude from the conical portion of the piston.

So that the piston is efficiently driven in the tensioning direction by the gas generated by a gas generator a sliding sealing is required between the piston and the cylinder tube. Usually this sealing is arranged in the tensioning direction ahead of the return stop, which means additional space required in the longitudinal direction. In the case of the tensioner according to the invention, this sealing can be arranged in the tensioning direction behind the return stop.

In this context, an embodiment in which the sliding sealing is formed by a cage member which is part of the return stop is of special advantage. In this case the sealing is advantageously arranged at the conical portion of the piston, more exactly speaking at the end thereof having the larger diameter.

In accordance with a further development of the invention, the tensioner includes an anti-twist protection for the tension transmission means. An anti-twist protection is important especially to linear drives without deflection of the tension transmission means, as in such structural designs a twist of the tension transmission means is not admissible.

In a preferred embodiment it is provided that the anti-twist protection includes a stationary acceptance and a molded part fixedly coupled to the tension transmission means, wherein a form closure exists between the acceptance and the molded part prior to actuation of the tensioner. The form closure between the molded part and the acceptance efficiently prevents twisting of the tension transmission means and the piston, respectively, relative to the surrounding components, especially to a drive-side sealing of the cylinder tube.

The molded part can be formed at least partly of a cage member attached to the piston which is part of the return stop.

Especially the cage member can extend over the connecting portion of the piston so that the connecting portion and the corresponding portion of the cage member attached to the piston have a specific non-circular outer circumference.

The acceptance for the molded part is preferably formed integrally with a holder for the drive.

For a reliable anti-twist protection a molded part and an acceptance having a polygonal profile, especially a hexagonal profile, are suited.

BRIEF DESCRIPTION OF THE DRAWINGS

Further features and advantages of the invention are resulting from the following description and from the enclosed drawings which are referred to. The drawings show in.

DESCRIPTION OF AN EMBODIMENT

Figure 1:
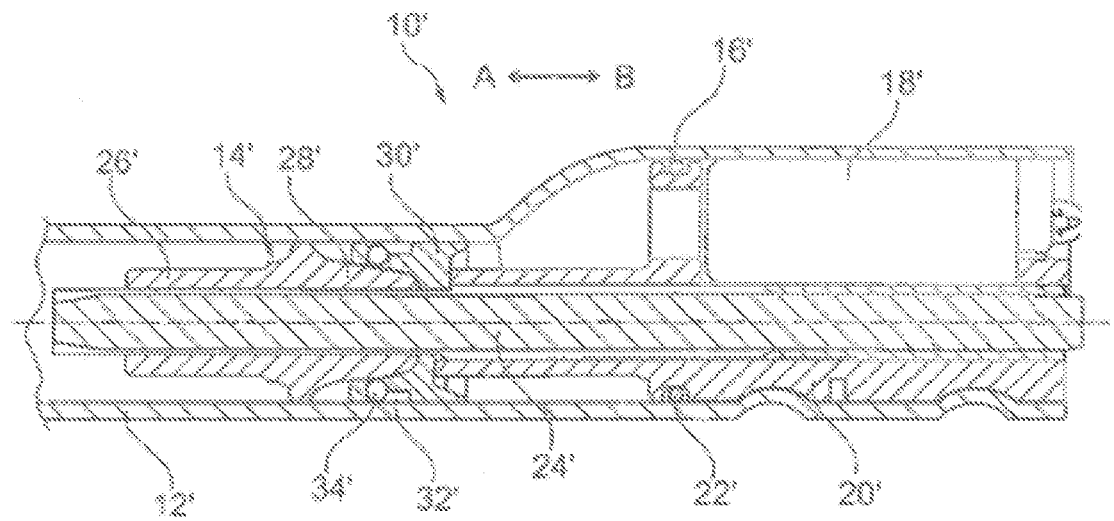
FIG. 1 a sectional view of a tensioner according to the state of the art.

The known linear tensioner 10 shown in FIG. 1 includes a cylinder tube 12' in which a piston 14' is movably arranged. The cylinder tube 12' includes a drive end 16' at which its cross-section is extended so as to accommodate a drive in the form of a gas generator 18'. A holder 20' for the gas generator 18' is pressed with the cylinder tube 12' and an O-ring 22' arranged between the holder 20' and the cylinder tube 12' seals the interior of the cylinder tube 12' at the drive end 16'.

A tension transmission means 24' in the form of a steel rope extends along the longitudinal axis of the cylinder tube 12' through a bore in the piston 14'. At the drive end 16' of the cylinder tube 12' the tension transmission means 24' exits from the cylinder tube 12'. Depending on the application, the respective end portion of the tension transmission means 24' can be guided around a deflection element (not shown). The corresponding end of the tension transmission means 24' is connected to a belt buckle or a belt deflector, or it acts on a seat belt at a different position. The piston 14' can be subdivided into a connecting portion 26' facing away from the drive end 16' and having a largely constant diameter and a conical portion 28' facing the drive end 16'. At the connecting portion 26' the piston 14' is fixedly connected to the tension transmission means 24', especially by pressing or squeezing so as to transmit the movement of the piston 14' to the seat belt.

The conical portion 28' of the piston 14' with its one end having a smaller diameter borders on the cage member 30'. The cage member 30' is fixedly connected to the piston 14' and slidably seals against the inner wall of the cylinder tube 12' so that the piston 14' can be displaced away therefrom in a tensioning direction according to the arrow A in FIG. 1 by the gas generated by the generator 18'.

In a cavity 32' between the conical portion 28' of the piston 14' and the cylinder tube 12' there are provided retaining elements 34' in the form of balls which can be clamped between the piston 14' and the inner wall of the cylinder tube 12'. The retaining elements 34' are guided by the cage member 30'. In this way the piston 14' is provided with a return stop preventing the piston 14' from returning to its initial position after the tensioning operation. While during movement of the piston 14' in the direction opposite to the tensioning direction (arrow B in FIG. 1) the conical portion 28' of the piston 14' forces the retaining elements 34' against the inner wall of the cylinder tube 12', the piston 14' gets jammed in the cylinder tube 12'.

In the known tensioner 10' shown in FIG. 1 the connecting portion 26' of the piston 14' is arranged behind the return stop viewed in the tensioning direction, i.e. on the side of the return stop facing away from the drive end 16'.

Hereinafter a tensioner according to the invention is described by way of FIGS. 2 to 10. The structure of the tensioner according to the invention partly corresponds to that of the known tensioner described before so that for components corresponding to each other the same reference numerals have been used, however without the addition ', and in so far the foregoing explanations can be referred to. Hence in the following primarily the differences as to structure and function shall be discussed.

Figure 2:
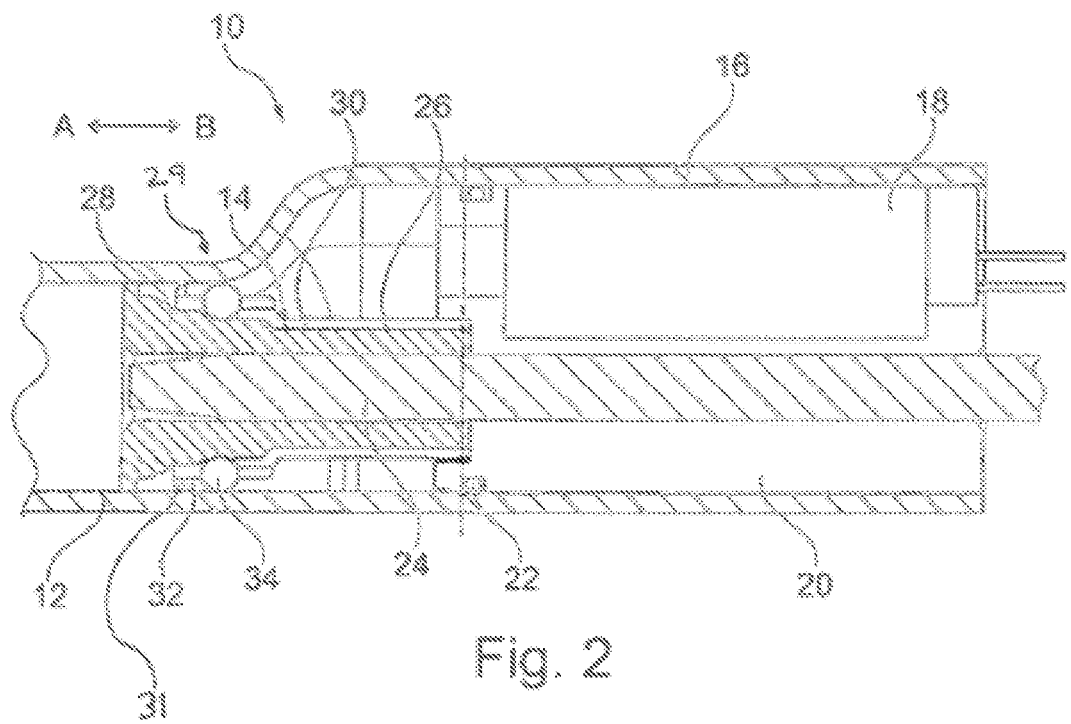
FIG. 2 a sectional view of a tensioner according to the invention.
Figure 3:
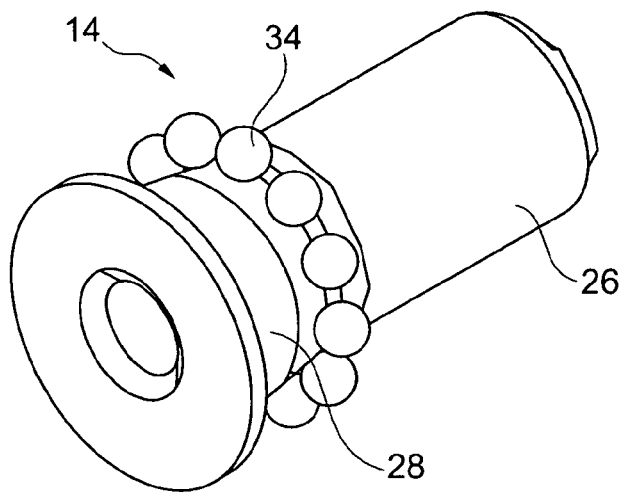
FIG. 3 a perspective view of the piston and the retaining elements of the tensioner according to the invention.
Figure 4:
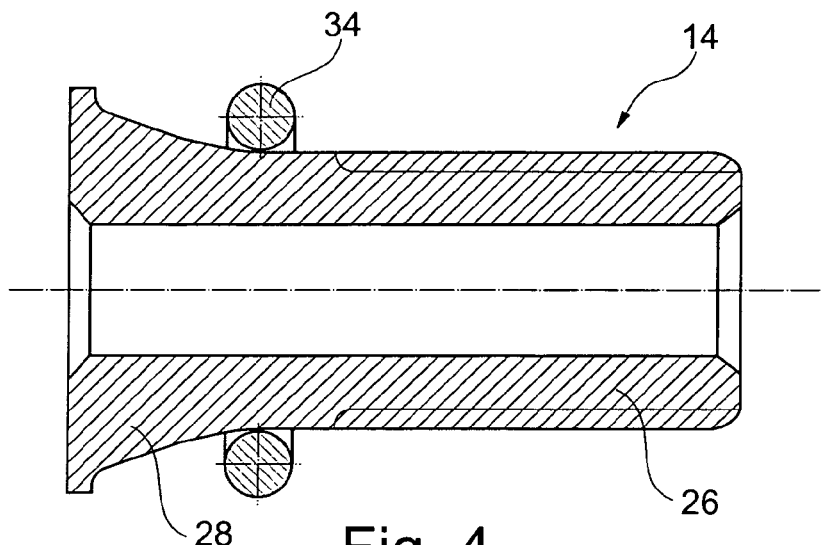
FIG. 4 a sectional view of the piston and the retaining elements of FIG. 3.
Figure 5:
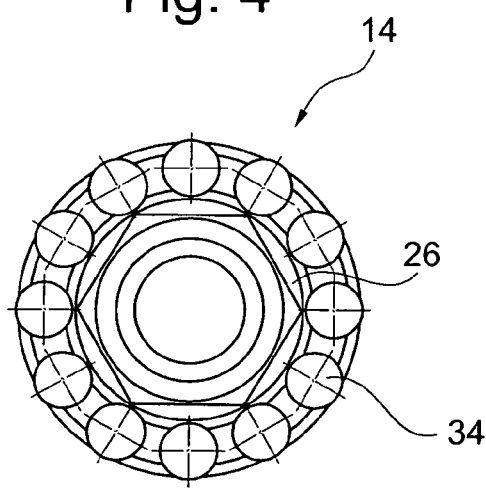
FIG. 5 a front side view of the piston and the retaining elements of FIG. 3.

As is evident from the FIGS. 3 to 5, the piston 14 again includes a connecting portion 26 and a conical portion 28 the end of which having the larger diameter is facing away from the drive end 16 (cf. FIG. 2). However, in this case the connecting portion 26 borders on the end of the conical portion 28 which has the smaller diameter. The connecting portion 26 thus is arranged ahead of the return stop 29 viewed in the tensioning direction A, i.e. on the side of the return stop facing the drive end 16. On the other side of the piston 14 the tension transmission means 24 does not or not significantly protrude from the conical portion 28 of the piston 14.

Figure 6:
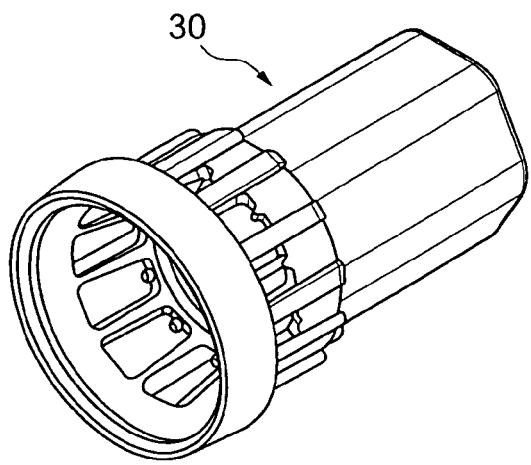
FIG. 6 a perspective view of the cage member of the tensioner according to the invention.
Figure 7:
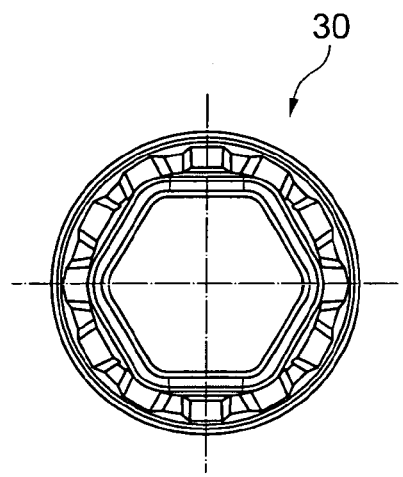
FIG. 7 a front side view of the cage member of FIG. 6.
Figure 9:
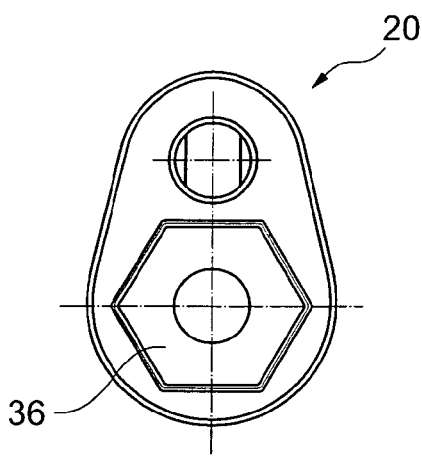
FIG. 9 a front side view of the holder of FIG. 8.
Figure 8:
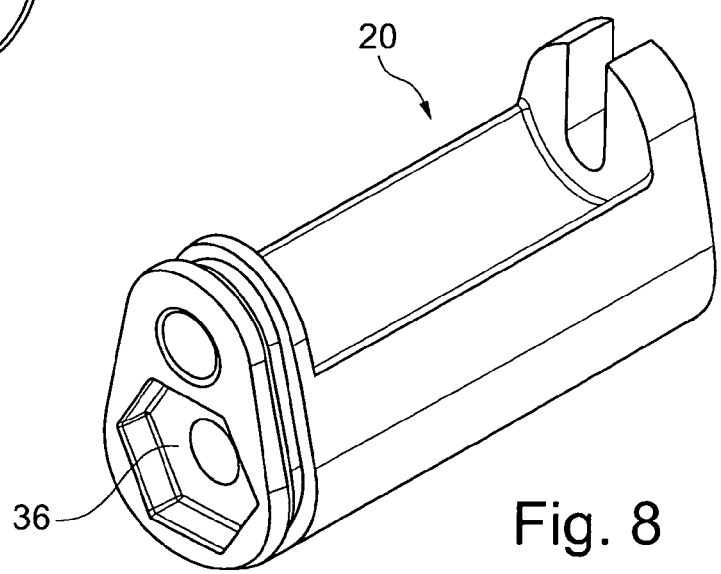
FIG. 8 a perspective view of the holder of the tensioner according to the invention.
Figure 10:
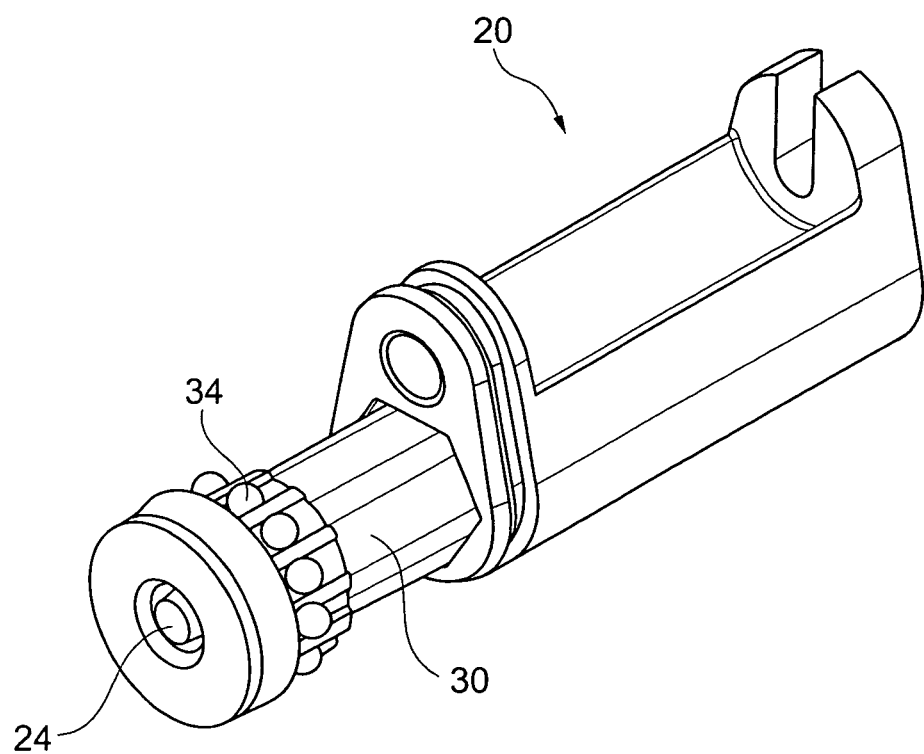
FIG. 10 a perspective view of particular components of the tensioner according to the invention in the assembled state.

The cage member 30 fixedly connected to the piston 14, which is separately shown in FIGS. 6 and 7, substantially extends over the entire piston 14, i.e. also over the connecting portion 26 to which the cage member 30 is closely adjacent. At the end of the conical portion 28 the cage member 30 slidably seals against the inner wall of the cylinder tube 12. In this case this seal 31 is thus provided on the side of the return stop facing away from the drive end 16.

Both the connecting portion 26 and the assigned portion of the cage member 30 have a hexagonal profile. This is evident especially in the FIGS. 5 and 7. The ends of the connecting portion 26 and the cage member 30 facing away from the conical portion 28 of the piston 14 consequently constitute a molded part and positively protrude into a stationary stable front-side acceptance 36 of the holder 20, i.e. the acceptance 36 has a matching hexagonal recess. The holder 20 including the acceptance 36 is shown individually in FIGS. 8 and 9 and in FIG. 10 in combination with the piston 14 and the cage member 30 as well as the retaining elements 34 provided therein and the tension transmission means 24.

The outer profile of the connecting portion 6 and the cage member 30 constitute, in combination with the acceptance 36, an anti-twist protection for the tension transmission means 24 fixedly connected to the connecting portion 26. For this purpose, instead of the hexagonal profile also a different appropriate profile can be provided, e.g. a rectangular profile.

The holder 20 including the acceptance 36 and the seal thereof (represented as O-ring 22 in FIG. 2) can also be combined to form one component.

The tensioner 10 exemplified in FIGS. 2 to 10 is shorter by 15 to 20 mm than the known tensioner 10' shown in FIG. 1.

LIST OF REFERENCE NUMERALS

10 tensioner
12 cylinder tube
14 piston
16 drive end
18 gas generator
20 holder
22 O-ring
24 tension transmission means
26 connecting portion
28 conical portion
30 cage member
32 cavity
34 retaining element
36 acceptance

The invention claimed is:

1. A tensioner (10) for a seat belt, comprising:
   a cylinder tube (12),
   a piston (14) that is movably arranged in the cylinder tube (12),
   a tension transmission means (24) connected to the piston (14) at a connecting portion (26) and transmitting the movement of the piston (14) to the seat belt,
   a drive (18) that is adapted to exert a driving force in a tensioning direction A on the piston (14), and
   a return stop that counteracts a displacement of the piston (14) in a direction B opposite to the tensioning direction A,
   wherein the connecting portion (26) is arranged in the tensioning direction A ahead of the return stop, and a sliding seal is arranged between the piston (14) and the cylinder tube (12) in the tensioning direction A behind the return stop,
   and wherein the piston (14) has a conical portion (28) which is part of the return stop and that the connecting portion (26) borders on the end of the conical portion (28) which has the smaller diameter.

2. The tensioner (10) according to claim 1, wherein the tension transmission means (24) does not or not significantly protrude from the conical portion (28) of the piston (14).

3. The tensioner (10) according to claim 1, wherein the sliding seal is formed by a cage member (30) which is part of the return stop.

4. The tensioner (10) according to claim 3, wherein the cage member (30) extends over the connecting portion (26) of the piston (14).

5. The tensioner (10) according to claim 1, wherein an anti-twist protection for the tension transmission means (24) is provided.

6. A tensioner (10) for a seat belt, comprising:
a cylinder tube (12),
a piston (14) that is movably arranged in the cylinder tube (12),
a tension transmission means (24) connected to the piston (14) at a connecting portion (26) and transmitting the movement of the piston (14) to the seat belt,
a drive (18) that is adapted to exert a driving force in a tensioning direction A on the piston (14), and
a return stop that counteracts a displacement of the piston (14) in a direction B opposite to the tensioning direction A,
the connecting portion (26) being arranged in the tensioning direction A ahead of the return stop, the piston (14) having a conical portion (28) which is part of the return stop and the connecting portion (26) bordering on the end of the conical portion (28) which has the smaller diameter, and
an anti-twist protection for the tension transmission means (24), the anti-twist protection including a stationary acceptance (36) and a molded part fixedly coupled to the tension transmission means (24), wherein a form closure is existing between the acceptance (36) and the molded part prior to actuation of the tensioner.

7. The tensioner (10) according to claim 6, wherein the molded part is formed at least partially of a cage member (30) attached to the piston (14) which is part of the return stop.

8. The tensioner (10) according to claim 6, wherein the acceptance (36) is formed integrally with a holder (20) for the drive (18).

9. The tensioner (10) according to claim 6, wherein the molded part and the acceptance (36) have a polygonal profile, especially a hexagonal profile.

* * * * *